United States Patent [19]

Johnson

[11] 4,166,097
[45] Aug. 28, 1979

[54] EXTRACTIVE RECOVERY OF TRIVALENT THALLIUM VALUES FROM AQUEOUS SOLUTIONS

[75] Inventor: Richard A. Johnson, Midland Park, N.J.

[73] Assignee: Halcon Research & Development Corporation, New York, N.Y.

[21] Appl. No.: 896,550

[22] Filed: Apr. 14, 1978

[51] Int. Cl.$^2$ .................. B01D 11/00; C01G 15/00; C22B 61/00; C01F 5/00
[52] U.S. Cl. ...................... 423/112; 15/101 R; 260/429 R; 423/658.5
[58] Field of Search ............... 260/429 R, 414; 423/112

[56] References Cited

U.S. PATENT DOCUMENTS

| | | | |
|---|---|---|---|
| 3,399,956 | 9/1968 | Hirose et al. | 260/429 R |
| 3,594,395 | 7/1971 | Taylor et al. | 260/429 R |
| 3,641,077 | 2/1972 | Rockow | 260/429 R |
| 4,139,594 | 2/1979 | Rizkalla | 423/112 |

FOREIGN PATENT DOCUMENTS 74-42765  11/1974  Japan .................. 423/112

277755  10/1970  U.S.S.R. .................. 423/112

OTHER PUBLICATIONS

Chemical Abstracts, 70, 100215n (1969).
Chemical Abstracts, 76, 37921w (1972).
Chemical Abstracts, 78, 48632v (1973).
Schweitzer et al., Anal. Chim. Acta 45, 192–195 (1969).
Chemical Abstracts, 84, 124786q (1976).
Chemical Abstracts, 57, 13525h (1962).
Chemical Abstracts, 65, 6298z (1966).

*Primary Examiner*—Helen M. S. Sneed
*Attorney, Agent, or Firm*—William C. Long; David Dick; Jack B. Murray, Jr.

[57] ABSTRACT

Trivalent thallium values are extractively recovered from aqueous media containing dissolved trivalent and monovalent thallium values by treating the aqueous medium with an extractant comprising a carboxylic acid medium having limited solubility in water to preferentially extract at least a portion of the dissolved trivalent thallium values into the carboxylic acid extractant medium and recovering a carboxylic acid extract containing the extracted trivalent thallium values as a separate phase.

16 Claims, No Drawings

EXTRACTIVE RECOVERY OF TRIVALENT THALLIUM VALUES FROM AQUEOUS SOLUTIONS

BACKGROUND OF THE INVENTION

1. Field of the Invention

This invention relates generally to the recovery of trivalent thallium values from solutions, and more specifically to the extractive recovery of trivalent thallium values from aqueous media.

2. Description of the Prior Art

Trivalent thallium compounds, i.e., thallic compounds, have been used as oxidizing agents in various reactions. For example, Kruse et al. J. Org. Chem. 36, 1154 (1971) describes the epoxidation of certain olefins with thallic acetate and U.S. Pat. No. 3,641,067 (issued in 1972 to W. Kruse) relates to the preparation of the epoxides of propylene and isobutylene by means of lower thallic alkanoates.

In all of these reactions the trivalent thallium is reduced to the monovalent state and, if the thallium is to be reused in the reaction, it is necessary to reoxidize or "regenerate" it by converting thallium (I) to thallium (III). Various methods for effecting this conversion have been proposed. Thus, it is proposed to convert thallium (I) to thallium (III) in the application of William Brill, entitled "Catalytic Conversion of Thallium (I) to Thallium (III)," Ser. No. 789,053, filed Apr. 21, 1977, by means of molecular oxygen using a Group VIII noble metal as a catalyst. In addition, it has been proposed in my earlier-filed application entitled, "Conversion of Mono-valent Thallium to Tri-valent Thallium," Ser. No. 740,147, filed Nov. 8, 1976, to convert thallium (I) to thallium (III) by means of molecular oxygen in the presence of a Group VIII noble metal catalyst and in the presence of a promoter comprising an alkali metal compound. The processes of both Ser. No. 789,053 and Ser. No. 740,147 typically result in an aqueous medium containing the desired trivalent thallium compound together with unconverted monovalent thallium compound and alkali metal compound, where the latter is employed as promoter in accordance with Ser. No. 740,147. It is generally desirable to recover the trivalent thallium compound from the aqueous medium produced by the foregoing processes to avoid passing monovalent thallium compound and alkali metal compound (where employed) as impurities to the subsequent reaction steps using the trivalent thallium compound. However, separation of the trivalent thallium compound from the aqueous medium by precipitation entails additional process steps which, albeit effective, introduce complexity into the recovery of the trivalent material, and evaporation of water from the aqueous medium containing the trivalent thallium compound does not achieve any separation of the trivalent thallium compounds from other salts contained in the aqueous medium.

It has been proposed in Japanese Patent Publication 50/92,296, published July 23, 1975, to extract thallic salts from aqueous solutions containing HBr or HCl using polar organic solvents and mixing the resulting organic layer with nonpolar organic solvents and water whereby the thallic ions are reextracted into the aqueous phase as the halogen thallium acid (e.g., HTlBr$_4$ or HTlCl$_4$). However, such a process is not readily adaptable to treatment of aqueous media containing monovalent and trivalent thallium values since the monovalent thallium ions will be precipitated as the corresponding halide, which precipitate must be recovered and treated for conversion of the monovalent thallium content thereof to a water-soluble form before further processing can be effected, e.g., before recycle of the monovalent thallium values to an oxidation step in which trivalent thallium values are formed therefrom.

Recovery of trivalent thallium values in the form of TlCl$_4$$^-$ or TlBr$_4$$^-$ using an anion exchange resin as suggested in U.S. Pat. No. 3,399,956 (issued in 1968 to I. Hirose et al.) is disadvantageous due to the high cost of the resin required for recovery of large amounts of trivalent thallium in an industrial scale process.

Other extraction techniques have been developed as analytical tools in which trivalent thallium ions are recovered from aqueous solutions employing such extractants as diethyldithiocarbamate and 8-quinolinol-4-thenoyltrifluoroacetone, as outlined in G. H. Morrison and H. Frieser, *Solvent Extraction in Analytical Chemistry* 237 (John Wiley & Sons 1957). However, such analytical extraction methods are not readily adaptable to industrial processes and offer the disadvantage of the extreme high cost of such extractants on an industrial scale.

Other extraction methods employed for treatment of liquids containing monovalent thallium are not readily adaptable to separation of trivalent thallium from aqueous mixtures containing monovalent thallium. See U.S. Pat. No. 4,031,196 (issued in 1977 to J. J. Leonard) (extraction of isobutyric acid with dibutyl ether from aqueous medium also containing barium salt and thallous isobutyrate) and A. Letheride et al, *J. Chem. Soc. Perkins I*, p. 2763 (1973) (extraction of aqueous mixture containing thallous trifluoroacetate and octene-1 oxidation products with ether). However, the aqueous media treated in these references, did not contain trivalent thallium.

SUMMARY OF THE INVENTION

It has been surprisingly found that trivalent thallium values can be preferentially extracted from an aqueous medium containing dissolved trivalent thallium values, monovalent thallium values and, optionally, alkali metal values by (i) contacting the aqueous medium with an extractant medium comprising a carboxylic acid having limited solubility in water to extract at least a portion of the dissolved trivalent thallium values into the carboxylic acid medium and (ii) recovering a carboxylic acid extract containing the extracted trivalent thallium values.

By this process up to about 100% of the trivalent thallium values can be extracted from the aqueous solution in a rapid and economical manner.

The facile separation of thallic values from thallous values and alkali metal values is surprising in view of the double salts known to be formed between thallium (III) and thallium (I) compounds and between such thallium compounds and alkali metal cations. See, e.g., A. South, Jr. et al., *JACS*, vol. 90, no. 25, 7064 (1968) and R. J. Oullette et al., *J. Org. Chem.*, vol. 35, no. 10, 3210 (1970), as to thallium (III)-thallium (I) double salts and F. Challenger et al., *J. Chem. Soc.* 405 (1934); and G. Newman, *Ann.*, vol. 244, p. 329 1888), as to mixed thallium-alkali metal salts.

DETAILED DESCRIPTION OF THE INVENTION

In accordance with the process of the present invention, an aqueous medium containing dissolved therein trivalent thallium values, monovalent thallium values, and, optionally, alkali metal values, is contacted with an extractant medium comprising a carboxylic acid having limited solubility in water to preferentially extract from the aqueous medium at least a portion of the dissolved trivalent thallium values into the carboxylic acid, preferably in the substantial absence of free halide to avoid precipitates of monovalent thallium halides. As used herein, trivalent thallium values are termed to be "preferentially extracted" when the proportion of the trivalent thallium values originally present in the aqueous solution which are extracted into the carboxylic acid extractant medium by the process of the present invention is greater than the proportion of the monovalent thallium values and alkali metal values originally present in the aqueous solution which are extracted into the extractant. Thus, while some monovalent thallium values and alkali metal values (where present) will also pass into the carboxylic acid extractant, the equilibrium distribution coefficients for trivalent thallium cation in the carboxylic acid aqueous systems of the present invention have been surprisingly found to be far greater than the equilibrium distribution coefficients for monovalent thallium and alkali metal cations, the equilibrium distribution coefficients being defined by the expression (I):

$$k_a = C_a / C_a' \qquad (I)$$

wherein $k_a$ is the equilibrium distribution coefficient for component "a", $C_a$ is the concentration of component "a" in the carboxylic acid phase, and $C_a'$ is the concentration of component "a" in the aqueous phase, as determined at 25°.

For example, the equilibrium distribution ("$k_{Tl3}$") for trivalent thallium cation is given by the expression (II):

$$k_{Tl3} = C_{Tl3} / C'_{Tl3} \qquad (II)$$

and the equilibrium distribution coefficient ("$k_{Tl1}$") is for monovalent thallium cation is given by the expression (III):

$$k_{Tl1} = C_{Tl1} / C'_{Tl1} \qquad (III)$$

Thus, for trivalent thallium to be "preferentially extracted" in accordance with the process of this invention, "$\alpha_1$" should be greater than 1, and preferably greater than 2, wherein "$\alpha_1$" is defined by the following expression (IV):

$$\alpha_1 = k_{Tl3} / k_{Tl1} \qquad (IV)$$

and "$\alpha_2$" should be greater than 1, and preferably greater than 2, wherein "$\alpha_2$" is defined by the following expression (V):

$$\alpha_2 = k_{Tl3} / k_{A.M.} \qquad (V)$$

wherein "$k_{A.M.}$" is the equilibrium distribution coefficient for alkali metal cation.

Carboxylic acids suitable for use as extractant in the present invention are mono- and di-carboxylic acids, both substituted and unsubstituted, which have limited solubility in water. The term "limited solubility in water" as used herein is intended to refer to carboxylic acids having a solubility in water at 20° C. of less than about 10 grams of acid per 100 grams of water. More preferably, however, the carboxylic acid possesses a solubility in water at 20° C. of less than about 2 grams of acid per 100 grams of water, and most preferably less than about 0.2 gram of acid per 100 grams of water.

Useful carboxylic acids which may be employed in the practice of this invention therefore include monocarboxylic acids of the formula (I):

wherein $R^1$, $R^2$, and $R^3$ are the same or different and are selected from the group consisting of hydrogen, alkyl, cycloalkyl, aryl, alkaryl, aralkyl, and derivatives of the foregoing groups wherein one or more carbon-bonded hydrogen atom is replaced by an alkyl, cycloalkyl or aryl group or a halide atom, and derivatives of the foregoing groups wherein one or more carbon atom is replaced by an oxygen atom, and substituted derivatives of the foregoing groups, with the proviso that $R^3$ cannot be hydrogen when $R^1$ and $R^2$ are each hydrogen, and with the further proviso that the monocarboxylic acid possesses at least five carbon atoms per molecule; and mixtures of the foregoing.

When $R^1$, $R^2$ or $R^3$ is alkyl, the alkyl group can be branched or straight chained and is generally from 1 to 20 carbon atoms, preferably from 1 to 8 carbon atoms. Exemplary of such alkyl groups are methyl, ethyl, propyl, isopropyl, butyl, isobutyl, pentyl, hexyl, heptyl, octyl, decyl, dodecyl, octadecyl and the like. When $R^1$, $R^2$ or $R^3$ is aryl, the aryl group is generally phenyl, tolyl, or naphthyl. When $R^1$, $R^2$ or $R^3$ is cycloalkyl, the cycloalkyl group is generally from 3 to 12 carbon atoms, and preferably from 5 to 8 carbon atoms. Exemplary of such cycloalkyl groups are cyclopropyl, cyclohexyl, cyclodecyl, cyclododecyl, dicyclohexyl, and the like. When $R^1$, $R^2$ or $R^3$ is alkaryl, the aryl component generally consists of phenyl or tolyl and the alkyl component generally has from 1 to 20 carbon atoms, and preferably from 1 to 8 carbon atoms. Examples of such aryl groups are 3-tolyl, 4-ethylphenyl, 3-xylyl, 4-isopropylphenyl, 2-butyl, 4-phenyl and the like. When $R^1$, $R^2$ or $R^3$ is aralkyl, the aryl group generally consists of phenyl or alkyl-substituted phenyl and the alkyl component generally has from 1 to 20 carbon atoms, and preferably from 1 to 8 carbon atoms. Examples of such aralkyl groups are benzyl, 2,2-diphenylmethyl and the like. The alkyl, cycloalkyl and aryl substituents on the substituted derivatives of the foregoing are similarly defined. Halide atoms which can be substituted on the foregoing include chloro-, bromo-, iodo- and fluoro-atoms. Ether derivatives of the foregoing groups in which a non-carbonyl carbon atom is replaced by an oxygen atom are, for example, in the case of alkyl groups, exemplified by alkoxy-substituted alkyl such as 2-methylhexyl and 3-ethoxypropyl, and, in the case of aralkyl groups, inclusive of phenoxy-substituted alkyl such as phenoxymethyl, benzoxyethyl, 4-phenoxyhexyl and the like.

Exemplary of monocarboxylic acids which may be employed, therefore, are straight-chained acids such as hexanoic acid, heptanoic acid, octanoic acid, decanoic acid, undecanoic acid, dodecanoic acid, tridecanoic acid, heptadecanoic acid, myristic acid, palmitic acid, stearic acid, and the like; straight-chained dicarboxylic acids such as adipic acid, pimelic acid, suberic acid, azelaic acid, sebacic acid and the like; branched-chain derivatives of the foregoing such as 2-ethylbutyric acid, 2,2-diethylbutyric acid, 2,2-dimethylpropanoic acid, 2,2-dimethylbutyric acid, 4-methylhexanoic acid, 2-methyldecanoic acid, 2-ethylhexanoic acid, 4-methylpentanoic acid, 4-ethylnonanoic acid, 2-ethyl-3-methylpropanoic acid, 2-ethyl-2-(n-propyl)-pentanoic acid and the like; and substituted derivatives of the foregoing including cyclohexyl acetic acid, 2-chloro-2-methylbutyric acid, triphenyl acetic acid, 2-bromo-2-phenyl propionic acid, 2-ethyl-2-methyl butyric acid, 4-chlorobutyric acid, 4-phenoxy butyric acid and the like.

Exemplary of dicarboxylic acids which are useful include straight-chained acids such as butanedioic acid, hexanedioic acid, heptanedioic acid, octanedioic acid, nonanedioic acid, decanedioic acid and the like, and substituted derivatives of the foregoing including 2-methyl, 3-dodecylbutanedioic acid, phenylbutanedioic acid, tetramethylbutanedioic acid and the like.

Preferred among the foregoing carboxylic acids are the monocarboxylic acids having at least 5 carbon atoms per molecule, and most preferred are such acids having from 6 to 12 carbon atoms per molecule. Exemplary of carboxylic acids preferred for use as extractant in the present invention are hexanoic acid, octanoic acid, neodecanoic acid, pivalic acid and undecanoic acid.

A wide variety of anions and mixtures of anions can be associated with the monovalent and trivalent thallium values in the aqueous medium which is treated in accordance with this invention. The anion may be organic or inorganic. Examples of suitable inorganic anions include nitrate, sulfate, perchlorate, nitrite, fluoride and the like. Suitable organic anions include carboxylate anions such as those derived from alkyl, cycloalkyl or aryl carboxylic acids having up to 20 carbon atoms per acid molecule, and preferably from alkyl carboxylic acids containing up to 5, and most preferably from 1 to 4, carbon atoms per acid molecule, e.g., acetate, propionate, butyrate, isobutyrate, pentanoate and the like, and mixtures of such carboxylates.

Preferably, trivalent thallium values are present in the aqueous medium as any of the following carboxylates, or mixtures thereof: acetate, propionate, butyrate and isobutyrate. The anion or mixture of anions associated with the monovalent thallium values can be the same or different from, the anion or anions associated with the trivalent thallium values contained in the aqueous medium. Also, the anion(s) associated with the trivalent and monovalent thallium in the carboxylic acid extract can differ from the anion(s) of the trivalent and monovalent thallium in the aqueous medium which is treated. For example, when aqueous media containing thallic acetate and thallous acetate are extracted with octanoic acid in accordance with the process of this invention, the anion of the thallic and thallous values in the carboxylic acid extract which is recovered will be found to be predominantly the octanoate. Thus, the terms "trivalent thallium values" and "monovalent thallium values" for convenience are used herein to refer to the cations $Tl^{+3}$ and $Tl^{+1}$, respectively, which are dissolved in the liquid medium to which these terms are applied and are used without regard to the anions with which such cations are associated.

The alkali metal values which can be optionally present in the aqueous medium treated in accordance with the present invention can be derived from any of the alkali metal compounds employed as promoters as described in my co-pending application Ser. No. 740,147, referred to above, which is hereby incorporated herein by reference. Thus, the alkali metal compound can comprise compounds of sodium, potassium, rubidium, cesium and lithium. Typical compounds are the oxide, salts (both organic and inorganic such as the carboxylates), the carbonates, bicarbonates and the like. The anion of the alkali metal compound most preferably corresponds to the anion associated with the trivalent thallium values to be extracted by the process of this invention. Of course, the precise form of the alkali metal values in the aqueous medium will vary depending on the degree to which such alkali metal compound is converted to another form by other ingredient of the aqueous medium. For example, when the aqueous medium contains free carboxylic acid (e.g., acetic acid), and alkali metal oxide (e.g., sodium oxide) which is added to the aqueous medium will be at least in part converted to the corresponding alkali metal carboxylate (e.g., sodium acetate). However, this is not critical to the practice of the present invention and, for convenience the term "alkali metal values" is used herein to refer to the alkali metal cations (e.g., $Na^{+1}$, $K^{+1}$, $Cs^{+1}$, $Rb^{+1}$ and the like) dissolved in the liquid medium to which this term is applied and is used without regard to the anion associated with such alkali metal cations.

The concentrations of monovalent thallium values, trivalent thallium values and alkali metal values in the aqueous medium treated by the process of the present invention is not in any way critical to the process of the present invention. Preferably, any solids, including solid mono- or tri-valent thallium compounds, present in the aqueous solution are first removed by conventional techniques such as filtration, centrifuging or allowing the aqueous solution containing the solids to settle and decanting the solution, in order to obtain an aqueous medium substantially free of solids for treatment in accordance with the process of the present invention. However, this is not required, and an aqueous medium containing such solids in addition to dissolved monovalent and trivalent thallium values may be also treated in accordance with the present invention.

The aqueous medium to be treated by the process of this invention may also contain free carboxylic acid of 1 to 5 carbon atoms where, for example, the aqueous medium is obtained as using any of the processes of Ser. Nos. 789,053 or 740,147, referred to above, in which such lower carboxylic acid was used as component of the reaction mixture in the conversion of monovalent thallium compound to trivalent thallium compound. The amount of such acid can vary widely but will generally be present in the aqueous medium in a concentration of from about 1 to 50 weight percent, preferably from about 1 to 20 weight percent. Preferably, the aqueous medium has a pH of not greater than about 6 and more preferably not greater than about 5.5, to avoid complicating the extractive recovery of trivalent thallium values therefrom as a result of the precipitation of substantial amounts of thallic oxide in alkaline media.

Water-immiscible organic solvents can be employed in the extractant medium to facilitate the handling of the more viscous carboxylic acids which are employed in the extractant medium and are especially preferred when dicarboxylic acids are employed. Water-immiscible organic solvents which are suitable include aromatic hydrocarbons, such as benzene, toluene, and the like; aliphatic hydrocarbons, such an pentane, hexane, isooctane, cyclohexane, and the like; petroleum ether; alkyl ether, such as diethyl ether, dimethyl ether, and the like; monocarboxylic acid esters, such as amyl acetate, methyl octanoate, and the like; organic alcohols such as amyl alcohol, 3-methyl-1-butanol, 1-pentanol, octanol, and the like; chlorohydrocarbons, such as chloroform, carbon tetrachloride, methylene chloride, and the like; substituted aromatic hydrocarbons, such as chlorobenzene, anisole, acetophenone, and the like; ketones and diketones, such as octanone, acetylacetone, and the like; and nitriles, such as butyronitrile, benzonitrile, and the like. The amount of such organic solvent in the carboxylic acid extractant medium is not critical to the process of the present invention, but will generally be employed in an amount of from 5 to 90 weight percent, and preferably from about 15 to 60 weight percent, of the amount of the carboxylic acid in the extractant medium.

While not critical to the practice of the process of this invention, the carboxylic acid extractant medium, as indicated above, is preferably substantilly free of free halide ions to avoid precipitation of monovalent thallium halides.

The manner in which the aqueous medium containing the dissolved trivalent thallium values, monovalent thallium values and, optionally, alkali metal values is contacted with the selected carboxylic acid extractant medium is not critical to this invention and can be effected employing conventional liquid/liquid extraction techniques and apparatus. Single- or multi-stage extraction techniques can be employed. Thus, the aqueous medium to be treated can be contacted with the carboxylic acid extractant medium in a batchwise, semi-continuous or continuous manner as by simultaneously introducing the aqueous medium to be treated and the carboxylic acid extractant medium into a stirred vessel wherein the mixture is agitated for intimate blending of the aqueous phase and organic, carboxylic acid phase. The resulting mixture can then be passed to a vessel wherein separate aqueous and organic layers are allowed to form. The organic layer comprises the carboxylic acid extract rich in trivalent thallium values and can be readily separated, and the recovered aqueous phase can be either recycled for admixture with additional carboxylic acid to remove additional trivalent thallium values therefrom, or, where desired, contacted with molecular oxygen or an organic hydroperoxide in the presence of a suitable catalyst in accordance with any of the processes of Ser. Nos. 740,147 or 789,053, referred to above, to convert monovalent thallium values contained therein to the trivalent state.

Alternatively, as is preferred, the aqueous medium to be treated can be contacted with the carboxylic acid extractant medium by use of conventional countercurrent liquid/liquid extraction techniques. Conventional extraction apparatus can be employed.

The relative amounts of aqueous medium and carboxylic acid extractant medium which are contacted can be varied widely and is solely a question of economics. Thus, the optimum volume of extractant can be easily ascertained by the skilled practitioner. Generally, however, for aqueous media containing from about 0.1 to 2.5 moles per liter trivalent thallium values, from about 0.1 to 10 volumes of carboxylic acid extractant medium are employed per unit volume aqueous medium to be treated to effect extraction of at least about 50 weight percent, preferably at least about 70 weight percent, of the trivalent thallium.

Likewise, the aqueous medium and carboxylic acid extractant medium can be corrected under a wide variety of temperature and pressure conditions. Thus, the temperature employed can range from 5° C. to the bubble point of the aqueous medium treated or the carboxylic acid extractant medium, whichever is lower boiling, and preferably from 20° to 80° C. Pressure is not a parameter of the process of this invention, and a pressure sufficient to maintain at least part of the aqueous medium to be treated and at least part of the carboxylic acid extractant medium in the liquid form will be suitable. Generally, the pressure will be from about 0.5 to 10 atm., preferably from about 1 to 2 atm.

The carboxylic acid extractant medium can contain the extracted trivalent thallium values, together with monovalent thallium values and alkali metal values, in a wide variety of concentrations and typically will contain from about 0.01 to 3 moles per liter, preferably from about 0.5 to 2 moles per liter, trivalent thallium values; from about 0.01 to 0.5 moles per liter, monovalent thallium values; and (when present in the aqueous medium which is treated) from about 0.01 to 3 moles per liter, preferably from about 0.01 to 0.5 moles per liter, alkali metal values. However, higher or lower amounts of the foregoing components can be present. The carboxylic acid extract can also contain up to about 20 weight percent, preferably up to only about 5 weight percent, water due to the limited solubility of water in the selected carboxylic acid.

The carboxylic acid extract containing the extracted trivalent thallium values can be withdrawn as product, and, where the trivalent thallium values are, for example, in the form of a carboxylate, can be used (either directly or after evaporation of a portion of the acid extract to concentrate the liquid with respect to the trivalent thallium) as source of trivalent thallium carboxylate for epoxidizing olefins in accordance with U.S. Pat. No. 3,641,067. If the carboxylic acid extract contains monovalent thallium values and, optionally alkali metal values, in addition to the desired trivalent thallium values, it can be treated by conventional methods for recovery of the trivalent thallium values therefrom. For example, the carboxylic acid extract can be treated with a source of free halogen ion (e.g., chloride, or bromide) to form the corresponding monovalent thallium halide as a precipitate, the halide solids removed, and the resulting treated extract contacted with an appropriate ion exchange resin to remove the alkali metal compound, thereby forming a carboxylic acid containing trivalent thallium values and having decreased amounts of monovalent thallium and alkali metal values dissolved therein. Alternatively, carboxylic acid extracts containing trivalent thallium, monovalent thallium and, optionally, alkali metal values, which are produced by the process of the present invention, may be treated for removal of monovalent thallium and alkali metal values therefrom by contacting the carboxylic acid extract with water in a separate step to extract at least part of the monovalent thallium and alkali metal values into the aqueous medium. Preferably, monovalent thallium and alkali metal values are removed from the carboxylic acid extract obtained in the present invention by use of the process disclosed in the application of Joseph Pugach, entitled "Extractive Purification of Carboxylic Acids Containing Monovalent and Trivalent Thallium Values," Ser. No. 896,401, which is being filed on even date herewith and which is hereby incorporated by reference.

The invention will be more fully understood by reference to the following specific examples, but it is to be understood that these examples are given solely for illustrative purposes and are not intended to be limitative of the invention. In the examples, the determination of trivalent thallium values is by complexometric titration with ethylenediamine tetraacetic acid, which method is sensitive to a concentration of 0.005 moles/liter and the determination of monovalent thallium values is by potassium permangenate titration. Alkali metal values are determined by a non-aqueous titration using perchloric acid in acetic acid; acetic anhydride is added to the sample before titration in an amount sufficient to eliminate any water present. In the examples that follow and throughout the specification, concentrations are expressed in terms of moles per liter unless otherwise indicated.

In each of the following Examples, the aqueous media which are treated employ a pH of less than about 6, and the Tables of data report concentrations of monovalent thallium, trivalent thallium and alkali metal values as the respective cations.

EXAMPLE 1

To the upper portion of an eleven-stage, continuous, countercurrent Schiebel extractor is passed at a rate of about 1,000 parts per hour an aqueous solution containing dissolved therein 0.088 mmol/cc thallous acetate, 0.093 mmol/cc thallic acetate, and 0.74 mmol/cc potassium acetate, and to the lower portion of the extractor is passed octanoic acid at a rate of about 330 parts per hour. From the extractor's upper portion there is removed about 230 parts per hour of extract comprising octanoic acid containing dissolved therein 0.12 mmol/cc thallous values, 0.24 mmol/cc thallic values, and 0.46 mmol/cc potassium values, and from the lower portion of the extractor there is withdrawn at a rate of about 1100 parts per hour a raffinate comprising an aqueous solution containing 0.04 mmol/cc thallous acetate, 0.58 mmol/cc potassium acetate and no detectable thallic acetate.

Thus, the extraction of the aqueous solution fed to the extractor with octanoic acid effected a 100% removal of thallic carboxylate therefrom.

The octanoic acid extract so recovered is then diluted with an equal volume of fresh octanoic acid to provide an organic acid phase containing dissolved therein 0.120 mmol/cc thallic values, 0.062 mmol/cc thallous values and 0.228 mmol/cc potassium values. The diluted octanoic acid solution so formed is then passed as feed at a rate of about 225 parts per hour to the lower portion of a second eleven-stage countercurrent Schiebel extractor. To the upper portion of the extractor there is passed, at a rate of 995 parts per hour, an aqueous acetic acid solution containing about 6 weight percent acetic acid in accordance with the process disclosed in the application of Joseph Pugach, entitled "Extractive Recovery of Trivalent Thallium Values From Carboxylic Acids," Ser. No. 876,401, filed Apr. 14, 1978, referred to above. An aqueous raffinate is withdrawn from the lower portion of the extractor at a rate of about 1005 parts per hour, the raffinate comprising an aqueous solution containing 0.014 mole/cc thallous acetate, 0.001 mmol/cc thallic acetate and 0.119, mmol/cc potassium acetate. From the upper portion of the extractor there is drawn at a rate of 200 parts per hour an octanoic acid depleted of thallous and potassium values and, 0.107 mmol/cc thallic values. Thus, recovery of trivalent thallium values is accomplished to an efficiency of about 79 percent based on the trivalent thallium values charged.

EXAMPLE 2

In a series of runs, separate portions of an aqueous solution containing 1.0 mole per liter of acetic acid, 0.21 mole per liter thallic acetate, 0.23 mole per liter thallous acetate and 0.95 mole per liter potassium acetate is treated with selected amounts of octanoic acid by passing the aqueous medium to be treated and the octanoic acid to a 150 cc separatory funnel and agitation of the funnel contents to intimately admix the separate phases. The agitation is continued for about 5 minutes at a temperature of about 25° C. and atmospheric pressure, whereupon the mixture is allowed to settle and separate organic and aqueous phases allowed to form. The recovered organic and aqueous phases are analyzed, thereby yielding the data set forth in Table 1. (In Table 1 and in the Tables that follow, "R" is defined as the number of unit volumes of carboxylic acid extractant employed per unit volume of treated aqueous medium.)

TABLE 1

| Run No. | R | Extracted Aqueous Phase | | | Carboxylic Acid Extractant Phase | | | Equilibrium Coefficient | | |
|---|---|---|---|---|---|---|---|---|---|---|
| | | $Tl^{+3}$ | $Tl^{+1}$ | $K^+$ | $Tl^{+3}$ | $Tl^{+1}$ | K | $kTl_3$ | $kTl_1$ | kK |
| 1 | 0.27 | 0.04 | 0.17 | 0.76 | 0.6 | 0.17 | 0.66 | 15.0 | 1.0 | 0.9 |
| 2 | 0.5 | 0.013 | 0.13 | 0.07 | 0.38 | 0.16 | 0.52 | 29.3 | 1.2 | 0.7 |
| 3 | 1.0 | 0.01 | 0.09 | 0.58 | 0.21 | 0.12 | 0.4 | 21 | 1.3 | 0.7 |

EXAMPLE 3

The procedure of Example 2 is repeated except that the concentration of thallic acetate is 0.38 mole per liter, the concentration of thallous acetate is 0.44 mole per liter and the concentration of potassium acetate is 2.0 moles per liter, in the aqueous medium to be treated. The data thereby obtained are set forth in Table 2.

TABLE 2

| Run No. | R | Extracted Aqueous Phase | | | Carboxylic Acid Extractant Phase | | | Equilibrium Coefficient | | |
|---|---|---|---|---|---|---|---|---|---|---|
| | | $Tl^{+3}$ | $Tl^{+1}$ | $K^+$ | $Tl^{+3}$ | $Tl^{+1}$ | K | $kTl_3$ | $kTl_1$ | kK |
| 1 | 0.27 | 0.18 | 0.36 | 1.78 | 0.94 | 0.21 | 1.28 | 5.2 | 0.6 | 0.7 |
| 2 | 0.5 | 0.06 | 0.32 | 1.6 | 0.64 | 0.22 | 0.87 | 10.7 | 0.7 | 0.5 |

TABLE 2-continued

| Run No. | R | Extracted Aqueous Phase | | | Carboxylic Acid Extractant Phase | | | Equilibrium Coefficient | | |
|---|---|---|---|---|---|---|---|---|---|---|
| | | $Tl^{+3}$ | $Tl^{+1}$ | $K^+$ | $Tl^{+3}$ | $Tl^{+1}$ | K | $kTl_3$ | $kTl_1$ | kK |
| 3 | 1.0 | 0.02 | 0.23 | 1.33 | 0.35 | 0.22 | 0.84 | 17.5 | 1.0 | 0.6 |

EXAMPLE 4

The procedure of Example 2 is repeated employing an aqueous medium containing 6.6 moles per liter acetic acid, 0.24 mole per liter thallic acetate, 0.22 mole per liter thallous acetate and 1.0 mole per liter potassium acetate. The results thereby obtained are set forth in Table 3.

TABLE 3

| Run No. | R | Extracted Aqueous Phase | | | Carboxylic Acid Extractant Phase | | | Equilibrium Coefficient | | |
|---|---|---|---|---|---|---|---|---|---|---|
| | | $Tl^{+3}$ | $Tl^{+1}$ | $K^+$ | $Tl^{+3}$ | $Tl^{+1}$ | K | $kTl_3$ | $kTl_1$ | kK |
| 1 | 0.5 | 0.12 | 0.15 | 0.81 | 0.18 | 0.12 | 0.6 | 1.5 | 0.8 | 0.7 |
| 2 | 1.0 | 0.07 | 0.12 | 0.7 | 0.14 | 0.11 | 0.4 | 2.0 | 1.0 | 0.6 |

EXAMPLE 5

The procedure of Example 2 is repeated employing an aqueous solution containing 1.0 mole per liter acetic acid, 0.21 mole per liter thallic acetate, 0.82 mole per liter cesium acetate and 0.21 mole per liter thallous acetate. The data thereby obtained are set forth in Table 4.

TABLE 4

| Extracted Aqueous Phase | | | Carboxylic Acid Extractant Phase | | | Equilibrium Coefficient | | |
|---|---|---|---|---|---|---|---|---|
| R | $Tl^{+3}$ | $Tl^{+1}$ | $C_s^{+1}$ | $Tl^{+3}$ | $Tl^{+1}$ | $C_s^{+1}$ | $kTl_3$ | $kTl_1$ | $^kC_s$ |
| 1.0 | 0.01 | 0.1 | 0.48 | 0.21 | 0.11 | 0.37 | 21 | 1.1 | 0.8 |

EXAMPLE 6

Following the procedure of Example 2, an aqueous medium containing 1.0 mole per liter acetic acid, 0.24 mole per liter thallic acetate, 0.2 liter thallous acetate, and either 0.66 mole per liter sodium acetate (Run 1) or 1.35 moles per liter rubidium acetate (Run 2) are extracted with equal volumes of octanoic acid, thereby yielding the data set forth in Table 5.

TABLES 5

| Run No. | R | Extracted Aqueous Phase | | | Carboxylic Acid Extractant Phase | | | Equilibrium Coefficient | | |
|---|---|---|---|---|---|---|---|---|---|---|
| | | $Tl^{+3}$ | $Tl^{+1}$ | $Na^{+1},Rb^{+1}$ | $Tl^{+3}$ | $Tl^{+1}$ | $Na^{+1},Rb^{+1}$ | $kTl_3$ | $kTl_1$ | kNa/Rb |
| 1 | 1.0 | 0.01 | 0.08 | 0.48[1] | 0.23 | 0.14 | 0.18[1] | 23 | 1.8 | 0.4[3] |
| 2 | 1.0 | 0.01 | 0.11 | 0.88[2] | 0.20 | 0.11 | 0.52[2] | 20 | 1.0 | 0.6[4] |

[1] $Na^{+1}$;
[2] $Rb^{+1}$;
[3] $k_{Na}$;
[4] $k_{Rb}$

EXAMPLE 7

Following the procedure of Example 2, an aqueous solution containing 1.0 mole per liter acetic acid, 0.22 mole per liter thallic acetate, 0.23 mole per liter thallous acetate and 1.07 moles per liter potassium acetate is contacted with an equal volume of hexanoic acid, thereby yielding the data set forth in Table 6.

TABLE 6

| Extracted Aqueous Phase | | | Carboxylic Acid Extractant Phase | | | Equilibrium Coefficient | | |
|---|---|---|---|---|---|---|---|---|
| R | $Tl^{+3}$ | $Tl^{+1}$ | $K^+$ | $Tl^{+3}$ | $Tl^{+1}$ | K | $kTl_3$ | $kTl_1$ | kK |
| 1.0 | 0.02 | 0.09 | 0.59 | 0.2 | 0.14 | 0.49 | 10 | 1.6 | 0.8 |

EXAMPLE 8

Following the procedure of Example 2, an aqueous medium containing 1.0 mole per liter acetic acid, 0.24 mole per liter thallic acetate and 0.22 mole per liter thallous acetate is contacted with an equal volume of neodecanoic acid, thereby yielding the data set forth in Table 7. In Run 1, the aqueous medium also contains 1.0 mole per liter potassium acetate. The aqueous medium treated in Run 2 contains no potassium acetate.

TABLE 7

| Run No. | R | Extracted Aqueous Phase | | | Carboxylic Acid Extractant Phase | | | Equilibrium Coefficient | | |
|---|---|---|---|---|---|---|---|---|---|---|
| | | $Tl^{+3}$ | $Tl^{+1}$ | $K^+$ | $Tl^{+3}$ | $Tl^{+1}$ | K | $kTl_3$ | $kTl_1$ | kK |
| 1 | 1.0 | 0.01 | 0.16 | 0.88 | 0.23 | 0.07 | 0.19 | 23 | 0.4 | 0.2 |
| 2 | 1.0 | 0.01 | 0.05 | — | 0.22 | 0.17 | — | 22 | 3.4 | — |

EXAMPLE 9

The procedure of Example 8 is repeated except that 2-ethyl hexanoic acid is used instead of the neodecanoic acid. The data thereby obtained are set forth in Table 8.

TABLE 8

| Extracted Aqueous Phase | | | Carboxylic Acid Extractant Phase | | | Equilibrium Coefficient | | |
|---|---|---|---|---|---|---|---|---|
| R | $Tl^{+3}$ | $Tl^{+1}$ | $K^+$ | $Tl^{+3}$ | $Tl^{+1}$ | K | $kTl_3$ | $kTl_1$ | kK |
| 1.0 | 0.01 | 0.13 | 0.8 | 0.23 | 0.08 | 0.24 | 23 | 0.6 | 0.3 |

EXAMPLE 10

Following the procedure of Example 2, an aqueous mixture containing 0.16 mole per liter thallic acetate, 0.22 mole per liter thallous acetate and 2.0 moles per liter acetic acid is treated with an extractant comprising either a mixture containing 83 weight percent octanoic acid and 17 weight percent ethyl ether or a mixture containing 83 weight percent pivalic acid and 17 weight percent ethyl ether. In each case, 0.67 unit volume of extractant are employed per unit volume of the treated aqueous medium. The data thereby obtained are set forth in Table 9.

The data thereby obtained indicate that about 77 and 58 mole percent of the trivalent thallium values present in the initial aqueous solution in Run 1 and 2, respectively, is removed.

TABLE 9

| Run No. | Extractant | Extracted Aqueous Phase | | Carboxylic Acid* Extractant Phase | | Equilibrium Coefficient | |
|---|---|---|---|---|---|---|---|
| | | $Tl^{+3}$ | $Tl^{+1}$ | $Tl^{+3}$ | $Tl^{+1}$ | $kTl_3$ | $kTl_1$ |
| 1 | Octanoic Acid & Ethyl Ether | .06 | .08 | .20 | .14 | 3.3 | 1.8 |
| 2 | Pivalic Acid & Ethyl Ether | .11 | .14 | .15 | .08 | 1.4 | 0.6 |

*No analysis made for KAc; carboxylic acid phase composition determined by difference.

EXAMPLE 11

Following the procedure of Example 2, separate portions of an aqueous mixture containing 0.24 mole per liter thallic acetate, 0.22 mole per liter thallous acetate, 1.0 mole per liter potassium acetate and 1.0 mole per liter acetic acid is treated in a series of runs with the selected extractant, employing an equal volume of extractant per unit volume of the treated aqueous medium in each run. The data thereby obtained are set forth in Table 10.

The extractants employed are as follows:

| Extractant | Composition |
|---|---|
| A | 3.5 M octanoic acid in benzene |
| B | 3.5 M octanoic acid in methyl caproate |
| C | 3.5 M octanoic acid in 1-hexanol |
| D | 3.5 M octanoic acid in methyl valerate |
| E | 3.5 M octanoic acid in hexane |
| F | 2.0 M octanoic acid in benzene |
| G | 3.0 M hexanoic acid in $CH_2Cl_2$ |
| H | 3.5 M hexanoic acid in benzene |
| I | 4.0 M hexanoic acid in 1-hexanol |
| J | 4.0 M hexanoic acid in methyl valerate |
| K | 4.0 M hexanoic acid in hexane |

TABLE 10

| Run No. | Extract-ant | Extracted Aqueous Phase | | | Carboxylic Acid Extractant Phase | | | Equilibrium Coefficient | | |
|---|---|---|---|---|---|---|---|---|---|---|
| | | $Tl^{+3}$ | $Tl^{+1}$ | $K^+$ | $Tl^{+3}$ | $Tl^{+1}$ | K | $kTl_3$ | $kTl_1$ | kK |
| 1 | A | .02 | .15 | .83 | .23 | .08 | .2 | 11.5 | 0.5 | 0.2 |
| 2 | B | .03 | .17 | .84 | .22 | 0.6 | .2 | 7.3 | 0.4 | 0.2 |
| 3 | C | .03 | .15 | .8 | .22 | .09 | .23 | 7.3 | 0.6 | 0.3 |
| 4 | D | .03 | .17 | .85 | .21 | .06 | .2 | 7.0 | 0.35 | 0.2 |
| 5 | E | .03 | .17 | .81 | .22 | .06 | .22 | 7.3 | 0.35 | 0.3 |
| 6 | F | .11 | .18 | .92 | .14 | .05 | .12 | 1.3 | 0.3 | 0.13 |
| 7 | G | .026 | .17 | .83 | .22 | .1 | .17 | 8.5 | 0.6 | 0.2 |
| 8 | H | .03 | .15 | .83 | .21 | .08 | .2 | 7.0 | 0.5 | 0.24 |
| 9 | I | .02 | .14 | .79 | .23 | .09 | .26 | 11.5 | 0.6 | 0.3 |
| 10 | J | .03 | .17 | .79 | .22 | .06 | .24 | 7.3 | 0.4 | 0.3 |
| 11 | K | .03 | .16 | .76 | .22 | .07 | .26 | 7.3 | 0.4 | 0.3 |

EXAMPLE 12

Repeating the procedure of Example 2, an aqueous medium containing 0.25 mole per liter thallic acetate, 0.22 mole per liter thallous acetate, 1.5 moles per liter potassium acetate and 0.5 moles per liter acetic acid is treated with an extractant comprising either (1) a mixture of 83 weight percent octanoic acid and 17 weight percent ethyl ether (2) 83 weight percent pivalic acid and 17 weight percent ethyl ether; (3) 71 weight percent pivalic acid and 29 weight percent ethylene glycol diacetate (EGDA) or (4) 75 weight percent pivalic acid and 25 weight percent EGDA. The data thereby obtained are set forth in Table 11. (In each run R=0.7.)

TABLE 11

| Run No. | Extractant | | | Extracted Aqueous Phase | | Carboxylic Acid Extractant Phase | | Equilibrium Coefficient | |
|---|---|---|---|---|---|---|---|---|---|
| | | | | $Tl^{+3}$ | $Tl^{+1}$ | $Tl^{+3}$ | $Tl^{+1}$ | $kTl_3$ | $kTl_1$ |
| 1 | Octanoic Acid | % | Ethyl Ether | .008 | .11 | .24 | .11 | 30.0 | 1.0 |
| 2 | Pivalic Acid | & | Ethyl Ether | .011 | .14 | .24 | .08 | 21.8 | 0.6 |
| 3 | Pivalic Acid | & | 29% EGDA | .007 | .12 | .24 | .10 | 34.3 | 0.8 |
| 4 | Pivalic Acid | & | 25% EGDA | .011 | .14 | .24 | .08 | 21.8 | 0.6 |

*Carboxylic acid phase composition determined by difference.

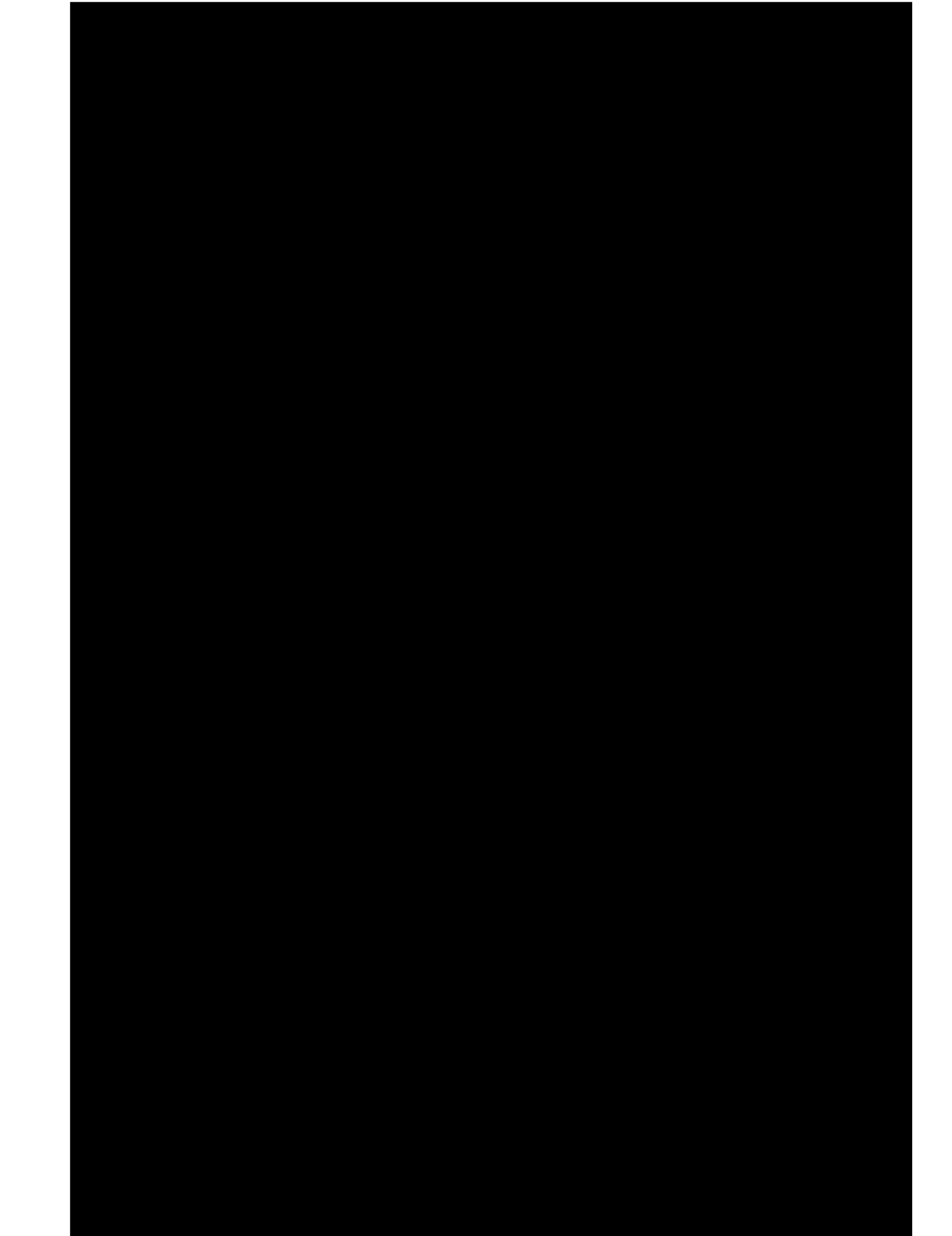

UNITED STATES PATENT AND TRADEMARK OFFICE
CERTIFICATE OF CORRECTION

PATENT NO. : 4,166,097
DATED : Aug. 28, 1979
INVENTOR(S) : Richard A. Johnson

It is certified that error appears in the above-identified patent and that said Letters Patent are hereby corrected as shown below:

Col. 2, line 34 - "Letheride" should be --Letheridge--

Col. 11 - "TABLES 5" should be --TABLE 5--

Col. 12 - in TABLE 8, the underlining for "Extracted Aqueous Phase" should be over the "$Tl^{+3}$" also Col. 14 - in TABLE 10, in Run No. 2, "0.6" should be --.06--

Col. 14 - in the TABLE 11 headings, "Carboxylic Acid" should have an asterisk after it; in Run No. 1, "%" should be --&--

Signed and Sealed this

Twelfth Day of January 1982

[SEAL]

Attest:

GERALD J. MOSSINGHOFF

Attesting Officer   Commissioner of Patents and Trademarks